United States Patent
Kim

(10) Patent No.: US 8,135,968 B2
(45) Date of Patent: Mar. 13, 2012

(54) SEMICONDUCTOR APPARATUS INCLUDING POWER MANAGEMENT INTEGRATED CIRCUIT

(75) Inventor: Dong-joon Kim, Seongnam-si (KR)

(73) Assignee: Samsung Electronics Co., Ltd., Suwon-Si, Gyeonggi-Do (KR)

(*) Notice: Subject to any disclaimer, the term of this patent is extended or adjusted under 35 U.S.C. 154(b) by 440 days.

(21) Appl. No.: 12/408,201

(22) Filed: Mar. 20, 2009

(65) Prior Publication Data

US 2009/0249088 A1    Oct. 1, 2009

(30) Foreign Application Priority Data

Mar. 28, 2008  (KR) .................. 10-2008-0029328

(51) Int. Cl.
*G06F 1/00* (2006.01)
*G06F 1/26* (2006.01)
*G06F 15/00* (2006.01)
*H04M 1/00* (2006.01)

(52) U.S. Cl. ........ 713/300; 713/320; 345/501; 455/574; 712/28; 712/32

(58) Field of Classification Search ............ 713/300, 713/320; 345/501; 455/574; 712/28, 32
See application file for complete search history.

(56) References Cited

U.S. PATENT DOCUMENTS

| | | | | |
|---|---|---|---|---|
| 5,812,860 A | * | 9/1998 | Horden et al. | 713/322 |
| 6,425,086 B1 | * | 7/2002 | Clark et al. | 713/322 |
| 7,071,768 B2 | * | 7/2006 | Abe et al. | 327/540 |
| 2004/0103330 A1 | * | 5/2004 | Bonnett | 713/322 |

FOREIGN PATENT DOCUMENTS

| | | |
|---|---|---|
| JP | 06083988 | 3/1994 |
| JP | 08036445 | 2/1996 |
| JP | 2004029983 | 1/2004 |

* cited by examiner

*Primary Examiner* — Stefan Stoynov
(74) *Attorney, Agent, or Firm* — Volentine & Whitt, PLLC

(57) ABSTRACT

Provided is a semiconductor apparatus including a power management integrated circuit. The semiconductor apparatus includes an application processor and a voltage management integrated circuit. The application processor outputs clock information on an operation clock signal, and includes a core circuit. The voltage management integrated circuit receives the clock information from the application processor, and generates and outputs a core voltage having a voltage level corresponding to the clock information in response to the clock information. The operation clock signal is a clock signal, which has a variable frequency and is input to the core circuit of the application processor.

14 Claims, 3 Drawing Sheets

SEMICONDUCTOR APPARATUS INCLUDING POWER MANAGEMENT INTEGRATED CIRCUIT

PRIORITY STATEMENT

A claim of priority is made to Korean Patent Application No. 10-2008-0029328, filed on Mar. 28, 2008, in the Korean Intellectual Property Office, the subject matter of which is hereby incorporated by reference.

SUMMARY

Embodiments of the present invention relate to a semiconductor apparatus including a power management integrated circuit (PMIC) for changing a core voltage.

A mobile system, such as a mobile phone, a navigator, a portable multimedia player (PMP), or the like, includes several PMICs. The PMICs supply power to the mobile system, which may include a core circuit, and thus the PMICs may supply power to the core circuit.

When the operation frequency of the core circuit changes, an operation voltage input to the core circuit likewise needs to change. This is because, when the operation voltage is not changed after the operation frequency of the core circuit changes, power consumption cannot be reduced. For example, when operation frequency is reduced, an operation voltage should be reduced accordingly, in order to reduce power consumption (or current consumption).

FIG. 1 is a graph illustrating a representative relationship between a clock frequency and a voltage in an application processor (AP). More particularly, FIG. 1 illustrates the variation of a core clock level. The term "core clock level" refers to the operation frequency level of a clock signal input to a core circuit (or a core block) included in an AP. Reference numeral 120 denotes an operation voltage input to the core circuit included in the AP.

A core clock level is 600 MHz during a first period 112 between time 0 and time t1, 200 MHz during a second period 114 between the time t1 and time t2, and 600 MHz during a third period 116 after the time t2. That is, the core clock level is changed from 600 MHz to 200 MHz at the time t1, and from 200 MHz to 600 MHz at the time t2.

It is assumed that an operation voltage of 1.1 V is necessary when the core clock level is 600 MHz and an operation voltage of 0.9 V is necessary when the core clock level is 200 MHz. Therefore, in order to reduce the power consumption of the mobile system, the operation voltage 120 should be changed from 1.1 V to 0.9 V at the time t1, and from 0.9 V to 1.1 V at the time t2.

In the depicted example, the second period 114 between the time t1 and the time t2, during which the core clock level is 200 MHz, is 1 ms. The operation voltage 120 during the second period 114 should be 0.9 V.

FIG. 2A is a block diagram of a conventional semiconductor apparatus 200 including an AP 210 and a voltage management integrated circuit 220. The AP 210 includes an interface circuit 212.

The AP 210 may be any AP that can be used in mobile systems. The AP 210 controls the voltage level of the voltage management integrated circuit 220 via the interface circuit 212. The interface circuit 212 requires software control to perform specific operations, for example, to change the voltage level and to set a new voltage level. The voltage management integrated circuit 220 generates a voltage having a voltage level changed according to a change in a core clock level, in response to the control of the AP 210.

Once the operation frequency of the AP 210 is changed, the interface circuit 212 sets a new operation voltage according to the change in the operation frequency, and transmits the new operation voltage to the voltage management integrated circuit 220. The new operation voltage is transmitted through a signal line 214 to the voltage management integrated circuit 220. The signal line 214 connects the interface circuit 212 and the voltage management integrated circuit 220 and transmits a voltage level.

The voltage management integrated circuit 220 generates and outputs an operation voltage having the voltage level, in response to the voltage level received from the interface circuit 212. A signal line 216 transmits the operation voltage generated by the voltage management integrated circuit 220 to the AP 210. However, it takes a certain amount of time for the interface circuit 212 to change the voltage level to set the new voltage level.

FIG. 2B is a graph illustrating a relationship between a voltage and a clock frequency in the AP 210 of the conventional semiconductor apparatus 200 of FIG. 2A. Referring to FIG. 2B, core clock levels during periods 252, 254 and 256 are 600 MHz, 200 MHz and 600 MHz, respectively.

As described above with respect to operation voltage 120 in FIG. 1, operation voltage 270 in FIG. 2B is ideal for reducing power consumption of a mobile system. However, the conventional semiconductor apparatus 200 cannot quickly change the operation voltage due to the software control of the interface circuit 212, when a core clock level is changed. That is, the software control of the interface circuit 212 required to set a new voltage level according to a change in the core clock level and to transmit the new voltage level to the voltage management integrated circuit 220 takes a certain amount of time.

Referring to FIG. 2B, when core clock level 250 changes from 600 MHz to 200 MHz at time t11, actual operation voltage 260 does not change until time t13, which is 200 μs later than time t11, for example. Accordingly, even though an operation voltage of only 0.9 V is necessary during the period between the time t11 and the time t13, the conventional semiconductor apparatus 200 continues to use an operation voltage of 1.1 V, resulting in unnecessary power consumption during the period between the time t11 and the time t13.

Also, the conventional semiconductor apparatus 200 changes the operation voltage 260 from 0.9 V to 1.1 V at a time t14, which is 120 μs earlier than time t12, for example, when the core clock level 250 changes from 200 MHz to 600 MHz, in order to prevent the voltage of 0.9 V from being used after the time t12. This causes further unnecessary power consumption during a period between the time t14 and the time t12.

Embodiments of the present invention provide a semiconductor apparatus including a power management integrated circuit, enabling a core voltage to be quickly and flexibly changed according to a change in frequency of an operation clock signal.

According to an aspect of the present invention, there is provided a semiconductor apparatus having a power management integrated circuit. The semiconductor apparatus includes an application processor and a voltage management integrated circuit. The application processor, which includes a core circuit, outputs clock information on an operation clock signal. The voltage management integrated circuit receives the clock information from the application processor, and generates and outputs a core voltage having a voltage level corresponding to the clock information in response to the clock information. The operation clock signal is a clock signal, which has a variable frequency and is input to the core circuit of the application processor.

The clock information may be included in the operation clock signal, or in an information signal having a frequency or a period of the operation clock signal.

The voltage management integrated circuit may include a clock information detection circuit that receives the clock information from the application processor, and generates a multiplexer (MUX) select signal in response to the clock information. The voltage management integrated circuit may also include a voltage generating device that selects one of multiple voltage levels used by the application processor and generates a voltage having the selected voltage level as the core voltage, in response to the MUX select signal.

The clock information detection circuit may detect a frequency of the operation clock signal by using the clock information, and output a MUX select signal corresponding to the detected frequency.

The voltage generating device may include a selection unit and a voltage generator. The selection unit stores the voltage levels, and selects and outputs one of the voltage levels in response to the MUX select signal. The voltage generator generates and outputs a voltage having the selected voltage level.

The selection unit includes a storage device array and a selector. The storage device array includes multiple storage devices for storing the voltage levels, respectively. The selector selects and outputs one of the voltage levels stored in the storage device array, in response to the MUX select signal. Each of the storage devices may include a resister. The selector may include a multiplexer. Also, the application processor may further include an interface circuit that sets the voltage levels and sends the set voltage levels to the storage device array to be stored.

The application processor may further include a clock generating unit that generates the operation clock signal. The clock generating unit may include a phase locked loop (PLL).

The application processor may further include a core circuit that receives the operation clock signal and the core voltage, and operates in synchronization with the operation clock signal. Also, the application processor may further include an interface circuit that sets the voltage levels used by the core circuit and sends the set voltage levels to the voltage management integrated circuit.

The clock information may be sent through a signal line other than a signal line connecting the interface circuit and the storage device array.

According to another aspect of the present invention, there is provided a semiconductor apparatus having a power management integrated circuit. The semiconductor apparatus includes an application processor and a voltage management integrated circuit. The application processor outputs clock information on an operation clock signal. The voltage management integrated circuit generates and outputs a core voltage in response to the clock information.

The voltage management integrated circuit includes a clock information detection circuit, a selection unit and a voltage generator. The clock information detection circuit receives the clock information from the application processor, and generates a multiplexer (MUX) select signal in response to the clock information. The selection unit stores multiple voltage levels used by the application processor, and selects one of the voltage levels in response to the MUX select signal. The voltage generator generates the core voltage having the selected voltage level, and outputs the core voltage to the application processor, where the selected voltage level corresponds to the clock information.

BRIEF DESCRIPTION OF THE DRAWINGS

The embodiments of the present invention will be described with reference to the attached drawings, in which.

DETAILED DESCRIPTION OF THE EMBODIMENTS

Figure 1:
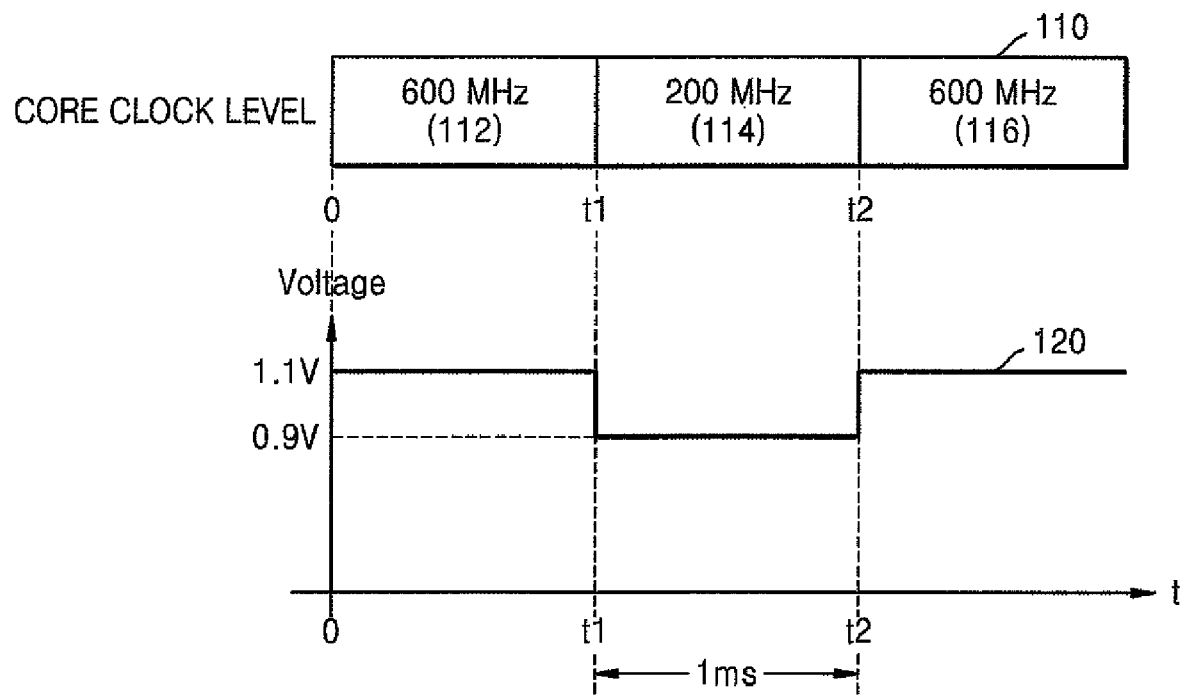
FIG. 1 is a graph illustrating an example of a relationship between clock frequency and voltage in an application processor (AP)

The present invention will now be described more fully with reference to the accompanying drawings, in which exemplary embodiments of the invention are shown. The invention, however, may be embodied in various different forms, and should not be construed as being limited only to the illustrated embodiments. Rather, these embodiments are provided as examples, to convey the concept of the invention to one skilled in the art. Accordingly, known processes, elements, and techniques are not described with respect to some of the embodiments of the present invention. Throughout the drawings and written description, like reference numerals will be used to refer to like or similar elements.

Figure 3:
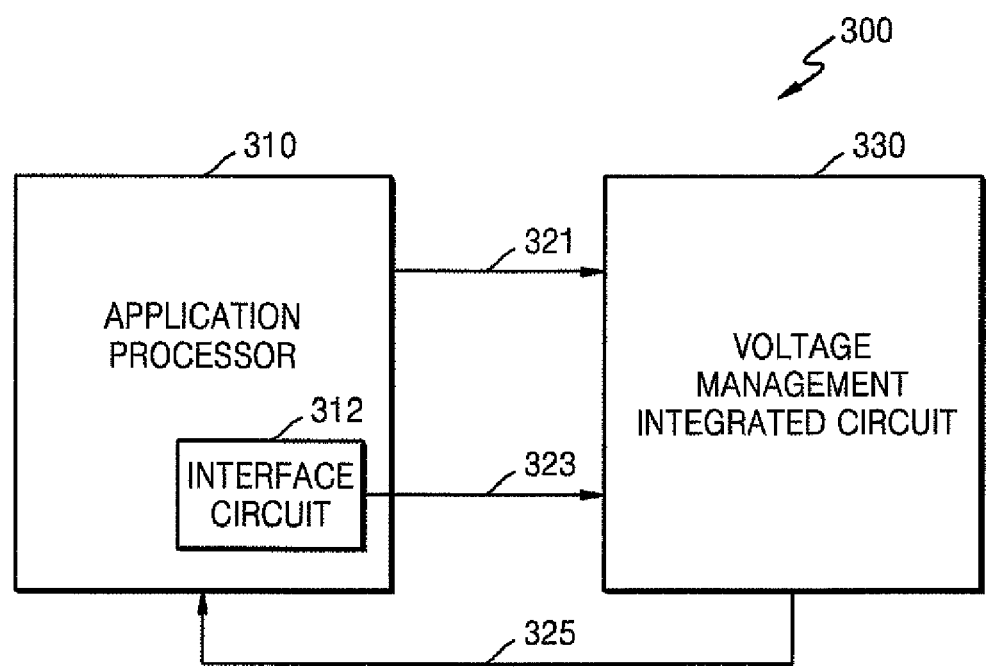
FIG. 3 is a block diagram of a semiconductor apparatus including a power management integrated circuit (PMIC), according to an embodiment of the present invention.

FIG. 3 is a block diagram of a semiconductor apparatus 300, including a power management integrated circuit (PMIC), according to an illustrative embodiment of the present invention.

Referring to FIG. 3, the semiconductor apparatus 300 includes an application processor (AP) 310 and a voltage management integrated circuit 330.

The AP 310 outputs clock information on an operation clock signal. Here, the operation clock signal refers to a clock signal which has a variable frequency and is input to a core circuit or a core block (not shown in FIG. 3) included in the AP 310. For example, the core circuit may transmit a command and write or read data, in synchronization with the operation clock signal. The configuration of the AP 310 and the core circuit would be apparent to one of ordinary skill in the art, and thus additional explanations are not included.

The clock information may be sent to the voltage management integrated circuit 330 through a signal line 321. The clock information may be provided in various forms. For example, the clock information may be included in the operation clock signal, or in an information signal that includes the frequency or the period of the operation clock signal.

The voltage management integrated circuit 330 receives the clock information from the AP 310, and generates and outputs a core voltage having a voltage level corresponding to the clock information in response to the clock information. The core voltage may be transmitted to the AP 310, specifically, to the core circuit in the AP 310, through a signal line 325.

The AP 310 may further include an interface circuit 312, and a signal line 323 connecting the interface circuit 312 and the voltage management integrated circuit 330. The semiconductor apparatus 300 including the PMIC will is explained in more detail with reference to FIG. 4.

Figure 4:
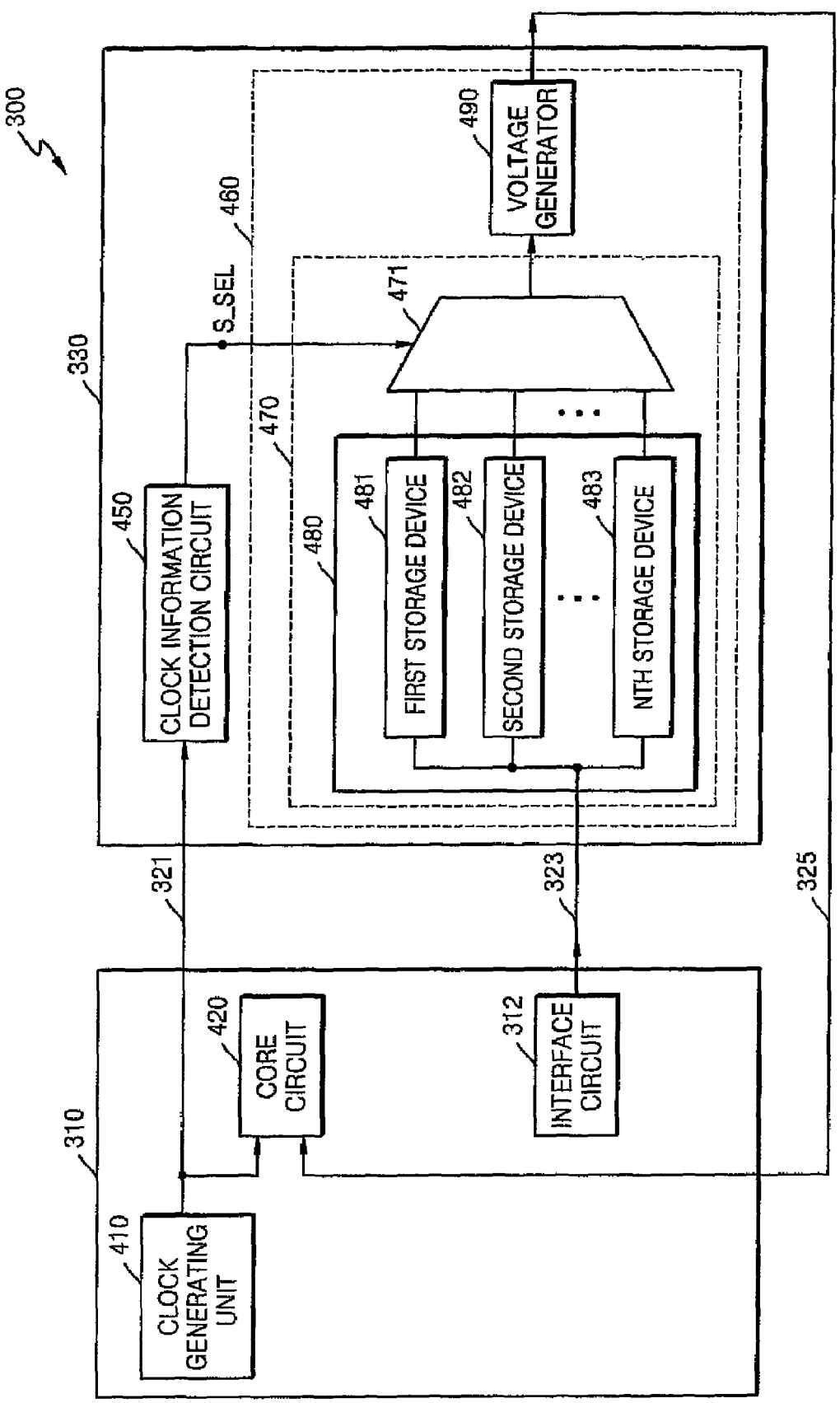
FIG. 4 is a detailed block diagram of the semiconductor apparatus of FIG. 3, according to an embodiment of the present invention.

FIG. 4 is a detailed block diagram of the semiconductor apparatus 300 of FIG. 3, according to an illustrative embodiment of the present invention.

Referring to FIG. 4, the voltage management integrated circuit 330 may include a clock information detection circuit 450 and a voltage generating device 460.

The clock information detection circuit 450 receives clock information from the AP 310, and generates a multiplexer (MUX) select signal S_SEL in response to the clock information. As described above with reference to FIG. 3, the clock information may be the operation clock signal itself, or it may be an information signal including the frequency or the period of the operation clock signal, for example. The clock information detection circuit 450 may detect the frequency of the operation clock signal using the received clock information, and generate and output the MUX select signal S_SEL corresponding to the detected frequency.

The voltage generating device 460 selects one of multiple voltage levels used by the AP 310, and generates a voltage having the selected voltage level as a core voltage, in response to the MUX select signal S_SEL. The voltage generating device 460 may include a selection unit 470 and a voltage generator 490.

The selection unit 470 stores the multiple voltage levels, and selects and outputs one of the voltage levels in response to the MUX select signal. In an embodiment, the selection unit 470 may include a storage device array 480 and a selector 471.

The storage device array 480 includes multiple storage devices 481 through 483, and respectively stores the voltage levels in corresponding storage devices 481 through 483. Each of the storage devices 481 through 483 may be a unit memory device including a resister, for example.

The selector 471 selects and outputs one of the voltage levels stored in the storage device array 480, in response to the MUX select signal S_SEL. The selector 471 may be simple selection means such as a multiplexer, for example.

The voltage generator 490 generates and outputs a voltage having the selected voltage level, as indicted by the selector 471. For example, when data 4 or 6 is input to the voltage generator 490, a voltage having a voltage level of 4 V or 6 V may be generated and output, respectively. Of course, in various embodiments, the relationships between the input data and the output voltage levels may vary. The voltage output by the voltage generator 490 may be provided to the AP 310 as the core voltage through the signal line 325.

The interface circuit 312 sets multiple voltage levels, and sends the set voltage levels to the storage device array 480, e.g., through signal line 323, which stores the received voltage levels, as discussed above. Here, the voltage levels set by the interface circuit 312 refer to the levels of voltages used by the core circuit 420 of the AP 310. As discussed above, the operation voltage of the core circuit 420 is not fixed, and may be vary depending on the frequency of an operation clock signal.

For example, for purposes of discussion, it may be assumed that an operation voltage of 1.1 V is necessary for an operation clock signal having a frequency of 600 MHz, and an operation voltage of 0.9 V is necessary for an operation clock signal having a frequency of 200 MHz. That is, the core circuit 420 uses multiple operation voltages according to changed operation frequencies of an operation clock signal, and the levels of the operation voltages used by the core circuit 420 are the "multiple voltage levels" set by the interface circuit 312. Of course, the multiple voltage levels may vary depending on a variety of factors, such as manufacturing specifications of the core circuit 420 and/or the AP 310.

Referring again to FIG. 4, the AP 310 may include a clock generating unit 410, the core circuit 420, and the interface circuit 312.

The clock generating unit 410 generates an operation clock signal. The clock generating unit 410 may include any appropriate clock generating device, such as a phase locked loop (PLL), a delayed locked loop (DLL), a crystal oscillator, or the like. The core circuit 420 receives the operation clock signal from the clock generating unit 410 and the core voltage from the voltage generator 490. In various embodiments, the core circuit 420 may or may not operate in synchronization with the operation clock signal.

The interface circuit 312 may be any appropriate interface circuits, such as an inter-integrated circuit (IIC or I2C), a serial peripheral interface (SPI) circuit, a general purpose input/output (GPIO) circuit, or the like. The interface circuit 312 of FIG. 4 does not set a voltage level for every frequency of the operation clock signal. The interface circuit 312 included in the semiconductor apparatus 300 of FIG. 4 sets voltage levels used by the core circuit 420, and sends the voltage levels to the storage device array 480, which stores the received voltage levels. In the example depicted in FIG. 1, the storage device array 480 would store voltages of both 1.1 V and 0.9 V.

Operation of the semiconductor apparatus 300 of FIG. 4 will now be explained. The interface circuit 312 sets all of the multiple voltage levels used by the core circuit 420, and the storage device array 480 of the voltage generating device 460 stores the set voltage levels. Since the clock generating unit 410 continuously transmits clock information to the clock information detection circuit 450, the clock information detection circuit 450 continuously detects the frequency of the operation clock signal using the received clock information.

Accordingly, the clock information detection circuit 450 outputs a MUX select signal S_SEL corresponding to the detected frequency. As applied to the example depicted in FIG. 1, for instance, when the clock information detection circuit 450 detects a frequency of 600 MHz, the clock information detection circuit 450 outputs a MUX select signal S_SEL so that a voltage level of 1.1 V is selected from among the voltage levels stored in the storage device array 480. When the clock information detection circuit 450 detects a frequency of 200 MHz, the clock information detection circuit 450 outputs a MUX select signal S-SEL so that a voltage level of 0.9 V is selected from among the voltage levels stored in the storage device array 480.

The clock information may be transmitted through a signal line 321 other than a signal line 323 connecting the interface circuit 312 and the storage device array 480. For example, the signal line 321 may be a signal line connected to a clock output pad pin.

Figure 2A:
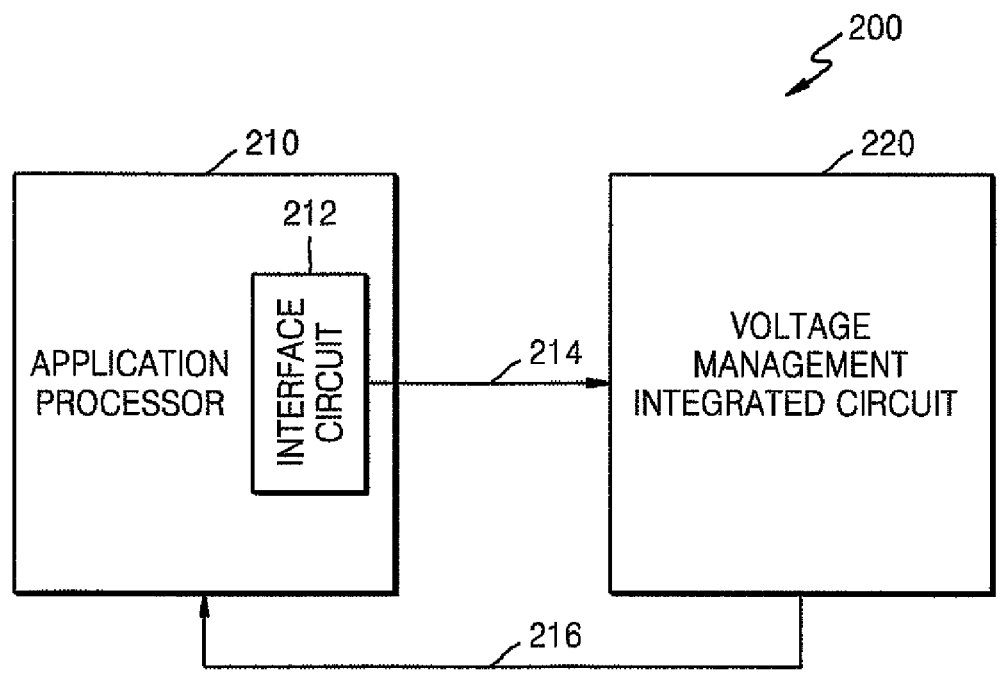
FIG. 2A is a block diagram of a conventional semiconductor apparatus including an AP and a voltage management integrated circuit.
Figure 2B:
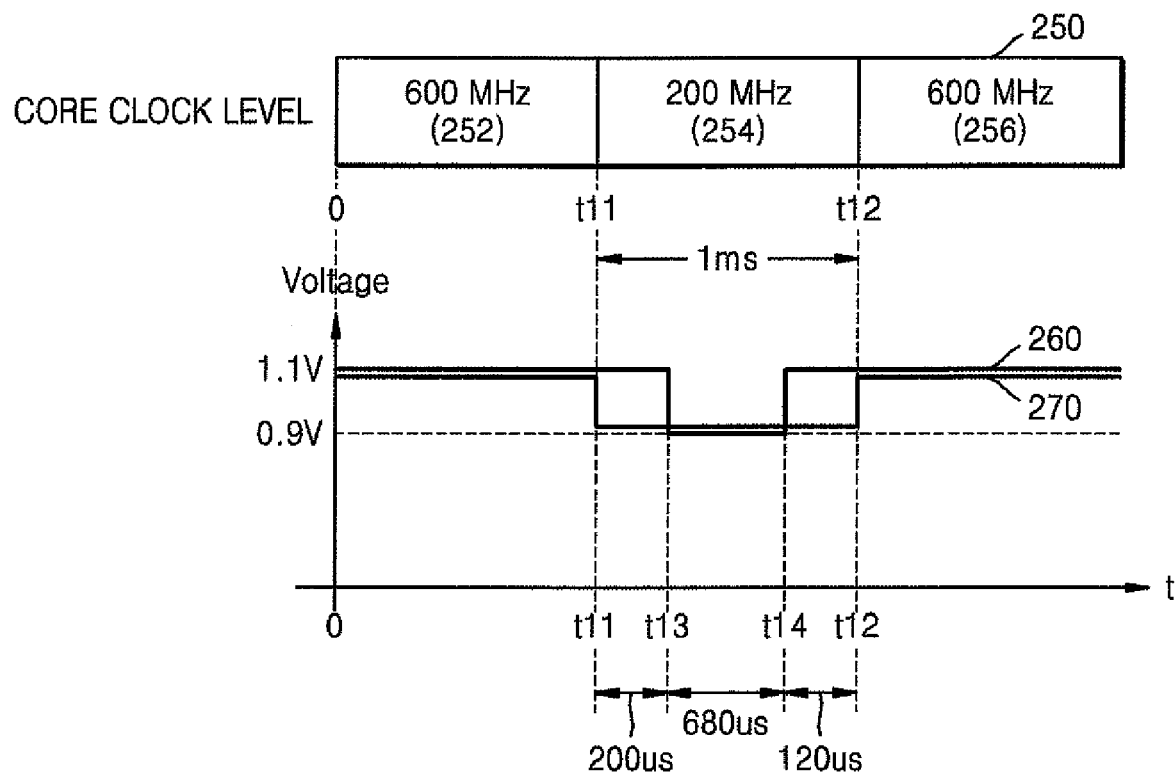
FIG. 2B is a graph illustrating a relationship between a clock frequency and a voltage in the AP of the semiconductor apparatus of FIG. 2A.

Since the voltage management integrated circuit 330 of FIG. 4 receives clock information, and selects and outputs a voltage having a voltage level corresponding to the clock information, the semiconductor apparatus 300 of FIG. 4 quickly and flexibly changes the operation voltage as the frequency of the operation clock signal changes. As a result, the excess power consumption which occurs during the periods between time t11 and time t13 and between time t14 and time t12 shown in FIG. 2B, for example, is eliminated. Thus, unnecessary power consumption due to the use of high current can be avoided.

As described above, the semiconductor apparatus including the PMIC, according to embodiments of the present invention can quickly and flexibly change a core voltage according to a change in the frequency of an operation clock signal, thereby reducing power consumption.

While the present invention has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A semiconductor apparatus including a power management integrated circuit, the semiconductor apparatus comprising:
   an application processor outputting clock information on an operation clock signal, the application processor comprising a core circuit; and
   a voltage management integrated circuit receiving the clock information from the application processor, and generating and outputting a core voltage having a voltage level corresponding to the clock information in response to the clock information,
   wherein the operation clock signal is a clock signal, which has a variable frequency and is input to the core circuit of the application processor,
   wherein the voltage management integrated circuit comprises:
      a clock information detection circuit receiving the clock information from the application processor, and generating a multiplexer (MUX) select signal in response to the clock information; and
      a voltage generating device selecting one of a plurality of voltage levels used by the application processor and generating a voltage having the selected voltage level as the core voltage, in response to the MUX select signal.

2. The semiconductor apparatus of claim 1, wherein the clock information is included in the operation clock signal, or in an information signal having a frequency or a period of the operation clock signal.

3. The semiconductor apparatus of claim 1, wherein the clock information detection circuit detects a frequency of the operation clock signal by using the clock information, and outputs a MUX select signal corresponding to the detected frequency.

4. The semiconductor apparatus of claim 1, wherein the voltage generating device comprises:
   a selection unit storing the plurality of voltage levels, and selecting and outputting one of the plurality of voltage levels in response to the MUX select signal; and
   a voltage generator generating and outputting a voltage having the selected voltage level.

5. The semiconductor apparatus of claim 4, wherein the selection unit comprises:
   a storage device array comprising a plurality of storage devices for storing the plurality of voltage levels, respectively; and
   a selector selecting and outputting one of the plurality of voltage levels stored in the storage device array, in response to the MUX select signal.

6. The semiconductor apparatus of claim 5, wherein each of the storage devices comprises a resister.

7. The semiconductor apparatus of claim 5, wherein the selector comprises a multiplexer.

8. The semiconductor apparatus of claim 5, wherein the application processor further comprises an interface circuit setting the plurality of voltage levels and sending the set plurality of voltage levels to the storage device array to be stored.

9. The semiconductor apparatus of claim 8, wherein the clock information is sent through a signal line other than a signal line connecting the interface circuit and the storage device array.

10. A semiconductor apparatus including a power management integrated circuit, the semiconductor apparatus comprising:
    an application processor outputting clock information on an operation clock signal, the application processor comprising a core circuit; and
    a voltage management integrated circuit receiving the clock information from the application processor, and generating and outputting a core voltage having a voltage level corresponding to the clock information in response to the clock information,
    wherein the operation clock signal is a clock signal, which has a variable frequency and is input to the core circuit of the application processor
    wherein the application processor further comprises a clock generating unit generating the operation clock signal,
    wherein the application processor further comprises the core circuit receiving the operation clock signal and the core voltage, and operating in synchronization with the operation clock signal, and
    wherein the application processor further comprises an interface circuit setting the plurality of voltage levels used by the core circuit and sending the set plurality of voltage levels to the voltage management integrated circuit.

11. The semiconductor apparatus of claim 10, wherein the clock generating unit comprises a phase locked loop (PLL).

12. A semiconductor apparatus including a power management integrated circuit, the semiconductor apparatus comprising:
    an application processor outputting clock information on an operation clock signal; and
    a voltage management integrated circuit generating and outputting a core voltage in response to the clock information,
    wherein the voltage management integrated circuit comprises:
       a clock information detection circuit receiving the clock information from the application processor, and generating a multiplexer (MUX) select signal in response to the clock information;
       a selection unit storing a plurality of voltage levels used by the application processor, and selecting one of the plurality of voltage levels in response to the MUX select signal; and
       a voltage generator generating the core voltage having the selected voltage level, and outputting the core voltage to the application processor, the selected voltage level corresponding to the clock information.

13. The semiconductor apparatus of claim 12, wherein the operation clock signal is a clock signal having a variable frequency and is input to a core circuit included in the application processor.

14. The semiconductor apparatus of claim 13, wherein the clock information comprises a frequency or a period of the operation clock signal.

* * * * *